United States Patent [19]

Chacko et al.

[11] Patent Number: 4,495,324

[45] Date of Patent: Jan. 22, 1985

[54] GLASS REINFORCED POLYAMIDE COMPOSITION CONTAINING ACRYLIC CORE/SHELL POLYMER

[75] Inventors: Varkki P. Chacko, Summit; Timothy J. Kraft, Pompton Plains, both of N.J.

[73] Assignee: Allied Corporation, Morris Township, Morris County, N.J.

[21] Appl. No.: 550,691

[22] Filed: Nov. 10, 1983

Related U.S. Application Data

[63] Continuation-in-part of Ser. No. 544,678, Oct. 24, 1983, abandoned.

[51] Int. Cl.$^3$ ............................................. C08K 3/40
[52] U.S. Cl. ............................ 524/504; 524/494; 524/514; 525/73; 525/179; 525/183; 525/184; 525/310; 525/902
[58] Field of Search ............... 525/73, 183, 179, 184, 525/310, 902; 524/514, 504

[56] References Cited

U.S. PATENT DOCUMENTS

| | | | |
|---|---|---|---|
| 3,655,825 | 4/1972 | Souder et al. | 260/876 R |
| 3,668,274 | 6/1972 | Owens et al. | 525/183 |
| 3,793,402 | 2/1974 | Owens | 260/876 R |
| 3,796,771 | 3/1974 | Owens et al. | 525/66 |
| 3,808,180 | 4/1974 | Owens | 260/885 |
| 3,971,835 | 7/1976 | Myers et al. | 260/876 R |
| 3,985,703 | 10/1976 | Ferry et al. | 525/902 |
| 3,985,704 | 10/1976 | Jones et al. | 260/42.32 |
| 4,096,202 | 6/1978 | Farnham et al. | 260/873 |
| 4,160,790 | 6/1979 | Mason et al. | 525/179 |
| 4,174,358 | 11/1979 | Epstein | 525/184 |
| 4,278,576 | 7/1981 | Goldman | 260/23 AR |
| 4,303,894 | 12/1982 | Locatelli | 524/514 |
| 4,306,040 | 12/1981 | Baer | 525/310 |
| 4,310,638 | 1/1982 | Coran et al. | 525/183 |
| 4,346,194 | 8/1982 | Roura | 525/183 |
| 4,375,532 | 3/1983 | Baer | 524/504 |
| 4,405,748 | 9/1983 | Nielinger et al. | 524/504 |

OTHER PUBLICATIONS

Rohm and Haas Company, Modifier Performance Properties, 1982, pp. 1–10.

*Primary Examiner*—Herbert J. Lilling
*Attorney, Agent, or Firm*—Richard A. Negin

[57] ABSTRACT

A composition comprising a polyamide, a reinforcing amount of glass fiber, and 1 to 25, preferably 5 to 25, and more preferably 10 to 20 percent by weight based on the weight of the polyamide of a core/shell polymer. The core/shell polymer comprises 40 to 90 and preferably 50 to 90 parts by weight of an elastomer core and 10 to 60 and preferably 10 to 50 parts by weight of a rigid thermoplastic polymer shell. The shell comprises an interpolymer of 20 to 100 parts by weight of an methyacrylic ester, 0 to 80 parts by weight styrene, and from 0 to 50 parts by weight of acylonitrile. The shell can also contain alkyl acrylates, allyl methacrylates, diallyl methacrylates, and the like. The methacrylic ester is preferably a lower alkyl methacrylate/such as methyl methacrylate. The core is an elastomer and can be a diene elastomer, an ethylene-propylene-diene rubber, an acrylic elastomer, or a polyurethane elastomer.

13 Claims, No Drawings

GLASS REINFORCED POLYAMIDE COMPOSITION CONTAINING ACRYLIC CORE/SHELL POLYMER

This is a continuation in part of application Ser. No. 544,678 filed Oct. 24, 1983, now abandoned.

DESCRIPTION

BACKGROUND OF THE INVENTION

The present invention is in the field of polyamide compositions; more particularly, the invention relates to a glass reinforced polyamide composition containing a core/shell polymer.

Various impact modifiers are known for use to improve the impact resistance of polyamides. Examples of such impact modifiers include those disclosed in U.S. Pat. Nos. 3,845,163; 4,160,790; and 4,174,358.

Of particular interest are the impact modifiers disclosed in U.S. Pat. Nos. 3,668,274 and 3,796,771. The impact modifiers disclosed in these patents are core/shell polymers. The disclosed core/shell polymers contain monomers which are reactive with the polyamide. Even with this reactive moiety there is no disclosure of the use of core/shell polymer impact modifiers and glass filled polyamide compositions.

Glass reinforced polyamide compositions having improved impact strength are known. U.S. Pat. No. 4,363,894 illustrates such a composition containing a methacrylic compound having the formula $[CH_2=CR-CO-A]_n-X$ wherein R is hydrogen or methyl, n is an integer equal to 2, 3 or 4, A is the linkage $-O-$ or $-NH-$ and X is an organic radical of valence n selected from the group consisting of a linear or branched chain alkylene radical having 1 to 20 carbon atoms. As indicated in the background of U.S. Pat. No. 4,363,894, glass reinforced polyamide compositions are difficult to modify to improve the impact strength. This is consistent with the findings disclosed in the comparative examples below which indicate that various known impact modifiers useful in unreinforced polyamide compositions result in little or no improvement in glass reinforced compositions.

U.S. Pat. Nos. 4,306,040 and 4,375,532 disclose polyamide compositions containing a shell/core polymers used to improve toughness. The particular shell/core polymers disclosed have crosslinked cores and have shells containing relatively reactive monomaleate or monofumarate of a $C_1$ to $C_4$ alcohol, in addition to styrene and acrylonitrile. The shell/core polymer was found to improve the impact strength of unfilled polyamide as well as polyamide containing up to 50 weight percent glass fibers.

U.S. Pat. No. 4,096,202 discloses a poly(alkylene terephthalate) composition containing an impact modifier which is a multiphase composite interpolymer (core/shell) comprising a crosslinked acrylic first stage and a final rigid thermoplastic stage.

SUMMARY OF THE INVENTION

The present invention is a composition comprising a polyamide, a reinforcing amount of glass fiber, and 1 to 25, preferably 5 to 25, and more preferably 10 to 20 percent by weight based on the weight of the polyamide of a core/shell polymer.

The core/shell polymer comprises 25 to 95 and preferably 50 to 90 parts by weight of an elastomer core and 5 to 75 and preferably 10 to 50 parts by weight of a rigid thermoplastic polymer shell. The shell comprises an interpolymer of 20 to 100 parts by weight of an methacrylic ester, 0 to 80 parts by weight styrene, and from 0 to 50 parts by weight of acylonitrile. The shell can also contain alkyl acrylates, allyl methacrylates, diallyl methacrylates, and the like. The methacrylic ester is preferably a lower alkyl methacrylate/such as methyl methacrylate. The core is an elastomer and can be a diene elastomer, an ethylene-propylene-diene rubber, an acrylic elastomer, or a polyurethane elastomer. The core can be crosslinked.

DESCRIPTION OF THE PREFERRED EMBODIMENTS

The present invention is a composition comprising a polyamide; a reinforcing amount of glass fiber; and from 1 to 25 preferably 5 to 25, and more preferably 10 to 20 percent by weight based on the weight of the polyamide of a core/shell polymer having a methacrylic ester polymeric shell. The use of the core/shell polymer in the composition results in an improvement in impact resistance of the glass filled polyamide composition. This was unexpected since the Comparative examples below indicated that such core/shell polymers having a methacrylic ester interpolymeric shell provide little improvement in the impact resistance of polyamide which contains no reinforcing glass fibers. In the past in order to improve the impact resistance of polyamides with core/shell polymer, the shell had to contain a reactive moiety such as monomaleates or monofumarates.

The core/shell polymer comprises 25 to 95, preferably 40 to 90 and more preferably 50 to 90 parts by weight of an elstomer core, and 5 to 75 and preferably 10 to 60, and more preferably 10 to 50 parts by weight of a rigid thermoplastic polymer shell. The shell comprises an interpolymer of 20 to 100 parts by weight of a methacrylic ester, 0 to 80 parts by weight styrene, and from 0 to 50 parts by weight of acylonitrile. The shell can also contain alkyl acrylates, allyl methacrylate, diallyl methacrylate and the like. The methacrylic ester is preferably a lower alkyl methacrylate/such as methyl methacrylate. The core is an elastomer and can be a diene elastomer, an ethylene-propylene-diene rubber, an acrylic elastomer, or a polyurethane elastomer. The core can be crosslinked.

The elastomer core can be of the type disclosed in U.S. Pat. No. 4,306,040, hereby incorporated by reference, and can be a diene elastomer, an ethylene-propylene-diene rubber, an acrylic elastomer, or a polyurethane elastomer. The diene elastomers include polybutadiene, polyisoprene, polychloroprene and poly(cyanobutadiene). The diene may be copolymerized with up to about 50 weight percent of other monomers such as alkyl acrylates and methacrylates, styrene, α-methylstyrene, acrylonitrile and substituted acrylonitriles, vinyl ethers, vinyl amides, vinyl esters and the like. The acrylic elastomers comprise 50 to 100 parts by weight of an alkyl acrylate containing 1 to 10 carbon atoms, preferably 2 to 8 carbon atoms, 0 to 40 parts by weight of other ethylenically unsaturated monomers and 0 to 5 parts by weight of a polyunsaturated crosslinking monomer such as polyacrylic and polymethacrylic esters of polyols such as butylene diacrylate and dimethacrylate, trimethylol propane trimethacrylate and the like, vinyl acrylate and methacrylate divinyl and trivinyl benzene and the like. As indicated in U.S.

Pat. No. 4,306,040 optionally from about 0 to about 5 parts by weight of a graft-linking monomer with two or more addition polymerizable unsaturated groups which participate in polymerization at different rates, may also be included. It is preferred that the graft-linking monomer has at least one reactive group which polymerizes at about the same rate, or slightly slower than the other monomers, while the remaining reactive group or groups polymerize at a substantially slower rate. The differential polymerization rates result in a residual level of unsaturation in the elastomer core, particularly during the latter stages of polymerization and, consequently, at or near the surface of the elastomer particles. When the rigid thermoplastic shell is subsequently polymerized at the surface of the elastomer, the residual unsaturated addition-polymerizable reactive groups contributed by the graft-linking monomer participate in the subsequent reaction so that at least a portion of the rigid shell is chemically attached to the surface of the elastomer. The crosslinked elastomer core preferably has a glass transition temperature below about $-25°$ C. and a swelling index ranging from about 2 to 20 determined in a good "solvent" for the elastomer, i.e. a solvent which has a solubility parameter close to the solubility parameter of the polymer and is similar in polarity and hydrogen bonding ability. Thus for polybutadienes, suitable solvents for determination of swelling index include benzene, toluene and tetrahydrofuran and for acrylic elastomers, suitable solvents include acetone, benzene and toluene.

The elastomeric core is prepared in bulk, in emulsion or in solution. Those prepared in bulk or solution are converted into aqueous emulsion by known techniques prior to the addition polymerization of the rigid polymer shell thereto.

The rigid thermoplastic polymer shell comprises a methacrylic ester, and optionally styrene and/or acrylonitrile. The relative amounts based parts by weight of the shell are from 20 to 100 parts of an methacrylic ester, 0 to 80 parts of styrene, and from 0 to 50 parts of acrylonitrile. One embodiment containing 5 to 50 parts by weight of the shell of styrene, 20 to 85 parts by weight methacrylic ester, and 10 to 50 parts by weight of acrylonitrile. The multiphase core/shell polymers are prepared by emulsion polymerization of the shell comonomers in the presence of an emulsion of the elastomer core by known techniques which favor the formation of rigid thermoplastic polymer shell around the elastomer core rather than discrete particles of rigid polymer separate from the core.

The elastomeric core emulsion preferably has a weight average particle diameter of 0.3 micron or more and the thickness of the rigid polymer shell calculated from the weight added to the above elastomer, is preferably at least about 0.025 micron to prevent sintering of the core/shell particles upon coagulation and drying, and to facilitate formation of a uniform dispersion of the core/shell polymer in the polyamide. More preferably the particle diameter is in the range of about 0.3 to about 0.8 micron and even more preferably it is in the range of about 0.4 to about 0.7 micron so that the proportion of rigid polymer shell necessary to prevent agglomeration and sintering of the emulsion particles during the coagulation and drying step is minimized.

When the elastomer core comprises a butadiene polymer or an acrylic polymer prepared by emulsion polymerization, the particle size is generally in the range of about 0.1 to about 0.2 micron. Seeding techniques can provide emulsions of larger particle size. However, since emulsion polymerization conditions which favor the formation of large particle size, may cause a significant degree of coagulation of the elastomer core causing kettle and detecting from the formation of fine, uniform dispersons of the multiphase core/shell polymer in the polyamide, it is generally preferred to form butadiene and acrylic elastomer core emulsions of large particle size in the range of about 0.3 to about 0.8 micron by controlled agglomeration of emulsions of 0.1 to 0.2 micro particle size. Agglomeration may be achieved by any conventional means such as by the addition of a suitable amount of water soluble, carboxylic acid or anhydride of such acid. The agglomerated emulsion is then stabilized by addition of a suitable emulsifier.

The amount of elastomer core in the multiphase core/shell polymer may range from about 40 to 90 and preferably 50 to 90 parts by weight with about 10 to 50 parts by weight of rigid polymer shell applied thereto. More perferably, the amount of elastomer core is in the range of about 60 to about 80 parts by weight and the amount of rigid polymer shell is in the range of about 20 to 40 parts by weight.

Polymerization of the rigid polymer shell is carried out under conditions which favor polymerization at or onto the surface of the elastomer core emulsion so that no substantial number of new "seeds" or particles form in the emulsion. This is generally accomplished by controlling the rate of addition of monomer, emulsifier and initiator. Preferably no further emulsifier is added after formation of the core elastomer emulsion. When polymerization is substantially complete, the multiphase core/shell polymer is coagulated by any convenient method such as by freezing, by addition of a coagulating solvent such as methanol optionally containing a small amount of strong acid such as hydrochloric acid, or by addition of any aqueous solution of apolyvalent metal salt such as magnesium sulfate or aluminum sulfate. The coagulated emulsion is washed with water and dried.

A description of a useful core/shell polymer is disclosed in U.S. Pat. No. 3,655,825, which is hereby incorporated by reference. Briefly, the core/shell polymer is comprised of a rubbery polymer formed by the emulsion copolymerizing of a lower alkyl ester of acrylic acid and a small amount of a cross-linking monomer such as one chosen from the diacrylate or dimethacrylate esters of polyfunctional alcohol. The copolymerization takes place with the aid of about 0.5 to about 1.0% of a suitable emulsifier to form an acrylate ester latex. Then in the presence of this preformed latex a lower alkyl ester of methacrylic acid is polymerized to produce a second or hard polymer under such conditions that essentially no new particles are formed.

The alkyl group and the lower alkyl ester of acrylic acid generally has a value of $C_2$ to $C_8$. The alkyl group can be a straight or branched chain. The alkyl group and the lower alkyl ester of methacrylic acid generally has a value of $C_1$ to $C_4$. The ratio of the hard phase (polymethacrylate) to the soft phase (polyacrylate) is within the range of 25/60 parts by weight of the former to 75/40 parts by weight of the latter.

Other useful core/shell polymers are disclosed in U.S. Pat. No. 4,096,202, hereby incorporated by reference. These core/shell polymers are described as the type having from 25 to 95 weight of a core or first stage and 5 to 75 of a shell or final rigid stage. There can be one or more intermediate stages. It is stated in U.S. Pat. No. 4,096,202 that, "The first stage is polymerized from about 75 to 99.8 weight percent $C_1$ to $C_6$ acrylate resulting in an acrylic rubber core having a Tg below 10° C. and crosslinked with from 0.1 to 5 weight percent of a crosslinking monomer and further containing 0.1 to 5 percent graftlinking monomer. The preferred alkly acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like, di- and trivinyl benzene, vinyl acrylate and methacrylate, and the like. The preferred crosslinking monomer is butylene diacrylate. The graftlinking monomer is a polyethylenically unsaturated monomer having a plurality of addition polymerizable reactive groups, at least one of which polymerizing at substantially different rate of polymerization from at least one other of said reactive groups. When the rigid thermoplastic phase is subsequently polymerized at the surface of the elastomer, the residual unsaturated addition polymerizable reactive group contributed by the graftlinking monomer participates in the subsequent reaction so that at least a portion of the rigid phase is chemically attached to surface of the elastomer. Among the effective graftlinking monomers are allyl group-containing monomers of allyl esters of ethylenically unsaturated acids such as allyl acrylate, allyl methacrylate, diallyl maleate, diallyl fumarate, diallyl itaconate, allyl acid maleate, allyl acid fumarate, and allyl acid itaconate. Somewhat less preferred are the diallyl esters of polycarboxylic acids which do not contain polymerizable unsaturation. The preferred graftlinking monomers are allyl methacrylate and diallyl maleate. A most preferred interpolymer has only two stages, the first stage comprising about 60 to 95 percent by weight of the interpolymer and being polymerized from a monomer system comprising 95 to 99.8 percent by weight butyl acrylate, 0.1 to 2.5 percent by weight butylene diacrylate as crosslinking agent, 0.1 to 2.5 percent by weight allyl methacrylate or diallyl maleate as a graftlinking agent, with a final stage polymerized from about 60 to 100 percent by weight methyl methacrylate. The impact modifiers of the present invention do not function as melt viscosity increasers as do the modifiers described in U.S. patent application Ser. No. 631,761 filed Nov. 13, 1975 now U.S. Pat. No. 4,034,013, since they do not contain a reactive outer stage, more particularly they do not contain reactive epoxide units in the outer stage.

The final stage monomer system can be comprised of $C_1$ to $C_{14}$ methacrylate, styrene, acrylonitrile, alkyl acrylates, allyl methacrylate, diallyl methacrylate, and the like, as long as the over Tg is at least 20° C. Preferably the final stage monomer system is at least 50 weight percent $C_1$ to $C_4$ alkyl methacrylate. It is further preferred that the final stage polymer be free of units which tend to degrade poly(alkylene terephthalates), for example acid, hydroxyl amino, and amide groups."

In an alternate embodiment the core/shell polymer has the same shell portion but has a methacrylate-butadiene styrene graft copolymer core. Such a core/shell polymer useful in the present invention is disclosed in U.S. Pat. Nos. 3,985,703 and 3,985,704 hereby incorporated by reference. In this particular core/shell polymer methyl methacrylate and styrene are graft polymerized in any order or proportion onto a polymerized butadiene or butadiene-styrene rubber polymer so as to form a latex of a two or more stage graft polymer.

Polyamides suitable for use in the composition of the present invention include polyamides which are long chained polymeric amides having reocurring amide groups as part of their polymer backbone. Preferably, the polyamides have a relative formic acid viscosity of from about 40 to about 250 measured in 90% formic acid at a concentration of 9.2 weight percent.

Non-limiting examples of such polyamides are:

(a) those prepared by the polymerization of lactams, preferably epsilon-caprolactam (nylon 6);

(b) those prepared by the condensation of a diamine with a dibasic acid, preferably the condensation of hexamethylene diamine with adipic acid (nylon 6,6) and the condensation of hexamethylene diamine with sebacic acid (nylon 6,10);

(c) those prepared by self-condensation of amino acids, preferably self-condensation of 11-aminounde-canoic acid (nylon 11); and (d) those based on polymerized vegetable oil acids, or random, block, or graft interpolymers consisting of two or more of these polyamides. Preferred polyamides are polyepsiloncaprolactam, polyhexymethylene adipamide, and a copolymer of polyepsiloncaprolactam and polyhexamethylene adipamide.

Also suitable for use herein are polyamide interpolymers comprised of a polyamide and one or more comonomers. Non limiting examples of such comonomers include acrylic or methacrylic acid and/or their derivatives, such as acrylonitrile, acrylamide, methyls, ethyls, propyl, butyl, 2-ethylhexyl, dexyl and tridecylesters of acrylic or methacrylic acid, vinyl esters such as vinyl acetate and vinyl propionate, vinyl aromatic compounds such as styrene, alpha-methyl styrene, and vinyl toluenes and vinyl ethers such as vinyl isobutyl ether.

It is further noted that the aforementioned polyamides containing various terminal functionality are also suitable for use in the present invention. Preferred are polycaprolactams (nylon 6) containing, (a) chain, (b) a carboxylic group attached to one end and an acetamide group attached to the other end of the polymer chain, (c) an amino group attached to both ends of the polymer chain and (d) a carboxyl group attached to one end and an amino group attached to the other end of the polymer chain. Particularly preferred is (d) above, a polycaprolactam having a carboxyl group attached to one end and an amino group attached to the other end of the polymer chain.

The short glass fiber reinforcement is at least about 0.005 inch in average length in the final product. These short lengths of fibrous reinforcement are obtained because of the characteristics of the processing apparatus used to compound or blend this reinforcement with the thermoplastic resin. For example, if fibers ⅛ inch or longer are placed in the feed hopper of a single screw extruder along with the resin, the fibers will ordinarily be broken down into lengths shorter than the original ⅛ inch starting length because of abrasion, shear, turbulence, mechanical work performed upon the fibers. Longer lengths (e.g., mean lengths longer than 0.005 inch in a major portion of the short fiber reinforcement) may be retained by minimizing the amount of shear or mechanical breakdown of fiber length, with some sacrifice in homogeneity or prolonged processing times. Another processing machine which may be used to blend and/or manufacture the short fiber-filled resinous sheet is a twin screw extruder. In this case, the filamentary reinforcing material may be added to agitated heat plastified polymer between the screws of the extruder through a feed port such as a volatile (vent) port. In the later case, the filamentary reinforcing material may be fed to the twin screw extruder in the form of yarn or roving, and the short fiber lengths would be obtained by the mechanical breakup performed by the mixing action of the screws.

Glass fibers as normally used for reinforcement of thermoplastics may be treated or coated with a sizing composition. Standard sizing agents usually consists of several components, each of which possesses a distinct function. For example, a binder gives the glass fiber strand integrity for workability and prevents fuzzing and aids in distribution of the sizing agent; a lubricant prevents destruction of the strand by abrasion of the individual filaments against each other and against fiber handling equipment; a coupling agent assists in obtaining greater adhesion between the glass fibers and the polymeric resin yielding improved strength characteristics; an emulsifying or dispersing agent allows sufficient dissolution of the various ingredients in the required carrying agent (frequently water) and improves compatibility between the various ingredients. In addition, pH adjusters, antistatic agents, wetting agents and surfactants are also often added to sizing formulations. Ordinarily, organosilicon compounds may suitably be employed as coupling agents. For example, halogenated or non-halogenated vinyl and alkyl containing alkylakoxy, alkenyl, aminoalkyl, aminoalkoxy, acryloxy, alkenyl acryloxy and similar silanes, their hydrolysis products and polymers of the hydrolysis products are suitable for such use. Formulations of this kind and methods of use are known to those skilled in the art.

Another constituent of the improved thermoplastic material herein described is particulate filler. Such fillers may be selected from a wide variety of minerals, metals, metal oxides, siliceous materials, metal salts, and mixtures thereof. These fillers may optionally be treated with various coupling agents or adhesion promoters, as is known to those skilled in the art. Examples of fillers included in these categories are alumina, aluminum hydrates, feldspar, asbestos, talc, calcium carbonates, clay, carbon black, quartz, novaculite and other forms of silica, kaolinite, bentonite, garnet, mica, saponite, beidellite, calcium oxide, calcium hydroxide, etc. The foregoing recited fillers are illustrative only and are not meant to limit the scope of fillers that can be utilized in this invention.

The particulate filler may be added to the thermoplastic resin before during or after the addition of the short glass fibers to the resin. Thus, for example, filler and resin pellets may be fed to the feed hopper of a single screw extruder; the mixture is blended and conveyed towards the die. Short glass fibers can be added to the molten mixture at a vent hole or other such opening downstream of the feed hopper, and the mixture then extruded into pellets.

Other minor additives which may be of value in the composition include antistatic agents, plasticizers, lubricants, nucleating agents, impact modifiers, colorants, heat and light stabilizers, or other similar processing aids.

The composition of the present invention is preferably made by melt blending. A preferred method is to melt blend the composition in an extruder above the polymer melt temperature. It is preferred to feed the fiberglass into the mixture through a side port. The fiberglass can be fed in a second extrusion pass. If the fiberglass is to be fed into the throat of the extruder it is preferred to first preblend the polymer and impact modifier. Preferred extruder conditions for polyepsiloncaprolactam are above 500° F. temperature profile.

Several examples are set forth below to illustrate the nature of the invention and the manner of carrying it out. However, the invention should not be considered as being limited to the details thereof.

EXAMPLES 1-11

In the following examples, compositions were prepared using polyepsiloncaprolactam (nylon) with different formic acid viscosities (FAV) as indicated. The nylon had polymer chains equally terminated with acid groups and amine groups unless otherwise noted. The fiberglass used as PPG 3540 produced by PPG Ind. This is an "E" type glass fiber. Filament diameter is approximately 10 micrometers. In the mold products, this fiberglass has an average aspect ratio of about 20:1. The original length of the fiberglass used is about ⅛ inch (3.175 mm). The fiberglass contains sizing and binder. The impact modifiers were core/shell type polymers.

The core/shell polymer impact modifiers used and preferred include Acryloid ® KM-330, KM-334, K-653, and KM-680 produced by the Rohm and Haas Company. Based on analysis it is believed that the Acryloid 330 and 334 are shell/core polymer having a shell made of polymethylmethacrylate and a core made of polybutylacrylate. This material is believed to contain minor amounts of 2-methyl butylacrylate/copolymerized with the butylacrylate.

Based on analysis it is believed that Acryloid 653 and 680 are shell/core polymers made of the following monomers; methylmethacrylate, butadiene, and styrene.

Testing was conducted on injection molded samples. The extrudate was pelletized and injection molded using a VanDorn injection molding machine at about 530° F. melt temperature. The testing included the testing of flexural modulus and flexural strength in accordance with ASTM Test No. D790 using ¼ inch by ½ inch flex bars. Tensile testing was conducted using Type I tensile samples in accordance with ASTM Test No. 638. Impact testing was conducted according to ASTM Test No. D256 notched Izod impact testing, and according to ASTM Test No. D 3029 drop weight impact testing.

The composition of Examples 1 and 2 and the Comparatives were prepared using a one inch diameter single screw extruder having a 24/1 L/D ratio of about 530° F. The nylon and impact modifier were blended in one pass and the fiberglass added in a second pass through the extruder.

The composition of Examples 3-11 were prepared by melt blending in a Egan single screw extruder having a screw diameter of 2½ inches and a L/D ratio of 24/1. The extruder was operated at approximately from 570° F. die to 500° at the die near entrance with a die temperature of approximately 500° F. The fiberglass was added through a side port directly to the molten polymer.

The compositions evaluated are summarized in Table 1, with amounts in percent by weight. The physical properties are summarized in Table 2.

TABLE 1

| Example | Nylon FAV | % | Acryloid Type | % | Fiberglass % |
|---|---|---|---|---|---|
| 1 | 65 | 53.7 | 330 | 13.3 | 33 |
| 2 | 65 | 53.7 | 653 | 13.3 | 33 |
| 3 | 65 | 56 | 330 | 11 | 33 |
| 4 | 65 | 56 | 334 | 11 | 33 |
| 5 | 65 | 58 | 653 | 9 | 33 |
| 6 | 65 | 57 | 680 | 10 | 33 |
| 7 | 45 | 54 | 330 | 13 | 33 |
| 8 | 45 | 54 | 653 | 13 | 33 |
| 9 | 60[1] | 54 | 653 | 13 | 33 |
| 10 | 60[1] | 54 | 330 | 13 | 33 |
| 11 | 65 | 54 | 653 | 13 | 33 |
| Comp |   |   |   |   |   |
| 1 | 65 | 100 | — | — | — |
| 2 | 65 | 68 | — | — | 32 |
| 3 | 65 | 85 | 330 | 15 | — |
| 4 | 65 | 80 | 330 | 20 | — |
| 5 | 65 | 80 | 330 | 20 | — |
| 6 | 65 | 80 | 653 | 20 | — |
| 7 | 65 | 80 | 653 | 20 | — |

[1] The 60 FAV nylon had excess amine polymer chain ends termination over acid chain ends.

TABLE 2

| Example | Flex Mod. × 10$^6$ psi | Flex Str. psi | Tens. Strength psi | Notched Izod ft-lb/in. notch | Drop wt. in-lbs. |
|---|---|---|---|---|---|
| 1 | 1.06 | 31,520 | 19,631 | 3.85 | — |
| 2 | 0.953 | 29,078 | 18,271 | 4.03 | — |
| 3 | 1.09 | 32,084 | 19,908 | 3.89 | 39 |
| 4 | 1.13 | 32,990 | 21,178 | 3.81 | 39.25 |
| 5 | 1.22 | 35,806 | 21,943 | 3.81 | 46.5 |
| 6 | 1.18 | 34,890 | 20,916 | 3.71 | 41.5 |
| 7 | 1.12 | 31,755 | 19,981 | 3.61 | 37.6 |
| 8 | 1.15 | 32,295 | 20,423 | 3.66 | 45 |
| 9 | 1.08 | 31,297 | 19,622 | 4.33 | 45.6 |
| 10 | 1.03 | 29,980 | 18,883 | 3.96 | 45.6 |
| 11 | 1.12 | 31,920 | 20,213 | 4.07 | 46.5 |
| Comp |   |   |   |   |   |
| 1 | — | — | — | 1.0 | — |
| 2 | 1.23 | 38,863 | — | 2.56 | — |
| 3 | .337 | 12,930 | — | 2.60 | — |
| 4 | .277 | 10,340 | 6,198 | 2.56 | — |
| 5 | .297 | 11,000 | — | 2.83 | — |
| 6 | .268 | 10,080 | 6,487 | 1.24 | — |
| 7 | .291 | 11,000 | — | 2.91 | — |

In addition to the Comparatives recited above, the following Comparatives are presented to illustrate that known impact modifiers for nylon generally are effective in a non-glass filled composition but lose their advantage when glass filler is added. The fiberglass is the same type as used in the Examples above. The compositions were melt blended using a single screw extruder as described in Examples 3-11. The nylon and impact modifier were added in one pass. Fiberglass was added in the second pass when fiberglass was used. The impact modifier system used was a combination of Surlyn 1801 produced by The DuPont Company and is believed to be a zinc neutralized copolymer of ethylene and methacrylic acid; and ethylene ethyl acrylate copolymer sold by Union Carbide as Bakelite ® Ethylene Copolymer DPD-6169 having a melt index of 6 g/10 min. (ASTM D1238).

The Comparative Compositions and properties are summarized in Table 3 below. Amounts are given in weight percent.

TABLE 3

|   | Comp 5 | Comp. 6 | Comp. 7 | Comp. 8 |
|---|---|---|---|---|
| Nylon | 72 | 48.2 | 57 | 68 |
| FAV | 125 | 125 | 65 | 45 |
| Fiberglass | — | 33 | 33 | 32 |
| Surlyn 1801 | 24 | 16.1 | 8 | — |
| EEA | 4 | 2.7 | 2 | — |
| Flex Mod × 10$^6$ (psi) | .244 | .875 | 1.07 | 1.23 |
| Flex Str. (psi) | 9700 | 22,500 | 29,800 | 38,863 |
| Tensile Str. psi | 7889 | 15,500 | 20,800 | — |
| Notched Izod ft-lb/in notch | 18.71 | 2.23 | 2.9 | 2.56 |
| Drop Weight Impact (in-lbs) | 160.6 | 20.8 | 24.5 | — |

EXAMPLES 12-15

In these examples, compositions were prepared from nylon having an FAV of 65. The nylon contained minor amounts of heat stabilizers. The impact modifiers used were Acryloid ® KM-330 and KM-653 produced by the Rohm and Mass Company. The fiberglass was that same type use in Example 1-11. Physical test procedures were the same as described for use in Examples 1-11.

The compositions were prepared in a single pass using an Egan single screw extruder operating at a barrel temperature of 570° F. and a die temperature of 500° F.

The compositions evaluated and physical properties are summarized in Table 4 below, with amounts in percent by weight.

TABLE 4

|   | Ex. 12 | Ex. 13 | Ex. 14 | Ex. 15 |
|---|---|---|---|---|
| Nylon | 79 | 60 | 79 | 60 |
| Fiberglass | 14 | 33 | 14 | 33 |
| Acryloid | 7 (330) | 7 (330) | 7 (653) | 7 (653) |
| Flex Mod × 10$^6$ psi | 0.702 | 1.25 | 0.702 | 1.23 |
| Notched Izod ft-lb/in. nitich | 2.29 | 3.60 | 2.45 | 3.38 |
| Drop wt. in-lbs | 37 | 37.9 | 34.3 | 40.0 |

While exemplary embodiments of the invention have been described, the true scope of the invention is to be determined from the following claims.

What is claimed is:

1. A composition comprising:
   a polyamide;
   a reinforcing amount of glass fiber; and
   from 1 to 25 percent by weight based on the weight of the polyamide of a core/shell polymer wherein the core/shell polymer comprises 40 to 90 parts by weight of an elastomeric core comprising an acrylic elastomer and 10 to 60 parts by weight of a rigid shell, the shell consisting essentially of from 20 to 100 parts by weight of a methacrylic ester, 0 to 80 parts by weight of styrene, and 0 to 50 parts of weight of acrylonitrile.

2. The composition as recited in claim 1 wherein there is from 10 to 25 percent by weight based on the weight of the polyamide of the core/shell polymer.

3. The composition as recited in claim 1 wherein there is from 5 to 20 percent by weight based on the weight of the polyamide of a core/shell polymer.

4. The composition as recited in claim 1 wherein the shell is poly(methyl methacrylate).

5. The composition as recited in claim 1 wherein the elastomer is selected from poly(butyl acrylate), and poly(ethyl acrylate).

6. The composition as recited in claim 1 wherein the shell consisting essentially of 5 to 50 parts by weight of styrene, 20 to 85 parts by weight of methacrylic ester, and 10 to 50 parts by weight of acrylonitrile.

7. A composition comprising:
a polyamide;
a reinforcing amount of glass fiber; and
from 1 to 25 percent by weight based on the weight of polyamide of a core/shell polymer wherein the core/shell polymer comprises 25 to 95 parts by weight of an elastomeric core comprising an acrylic elastomer and from 5 to 75 parts by weight of a rigid shell wherein the shell is polymerized from monomers selected from the group consisting of methacrylic esters, styrene, acrylonitrile, alkyl acrylates, allyl esters and a mixture thereof.

8. The composition as recited in claim 7 wherein the core further comprises from 0.1 to 5 percent of a cross-linking monomer.

9. A composition comprising:
a polyamide;
a reinforcing amount of glass fiber; and
from 1 to 25 percent by weight based on the weight of the polyamide of a core/shell polymer wherein the core/shell polymer comprises 25 to 95 parts by weight of an elastomeric core comprising an acrylic elastomer and from 5 to 75 parts by weight of a rigid shell wherein the shell is polymerized from at least one monomer selected from the group consisting of methacrylic esters, styrene, acrylonitrile, alkyl acrylates, and a mixture thereof.

10. The composition as recited in claim 9 wherein there is from 20 to 100 parts by weight of a methacrylic ester.

11. The composition as recited in claim 9 wherein the core further comprises from 0.1 to 5 percent of a cross-linking monomer.

12. The composition as recited in claim 7 wherein the methacrylic ester is alkyl methacrylate.

13. The composition as recited in claim 9 wherein the methacrylic ester is selected from the group consisting of alkyl methacrylate and diallyl methacrylate.

* * * * *